United States Patent
Hojo et al.

(10) Patent No.: US 10,442,378 B2
(45) Date of Patent: Oct. 15, 2019

(54) VEHICLE BODY STRUCTURE

(71) Applicant: HONDA MOTOR CO., LTD., Tokyo (JP)

(72) Inventors: Akira Hojo, Wako (JP); Ryohei Hayashi, Wako (JP); Tomohide Sekiguchi, Wako (JP); Teruaki Aizawa, Wako (JP); Keiichiro Tsuji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 14 days.

(21) Appl. No.: 15/852,978

(22) Filed: Dec. 22, 2017

(65) Prior Publication Data

US 2018/0178742 A1 Jun. 28, 2018

(30) Foreign Application Priority Data

Dec. 28, 2016 (JP) .................................. 2016-254795

(51) Int. Cl.
*B60R 19/26* (2006.01)
*B60R 19/34* (2006.01)
*B60R 19/02* (2006.01)

(52) U.S. Cl.
CPC ............ *B60R 19/26* (2013.01); *B60R 19/023* (2013.01); *B60R 19/34* (2013.01)

(58) Field of Classification Search
CPC ....... B60R 19/02; B60R 19/023; B60R 19/24; B60R 19/26; B60R 19/28; B60R 19/34
USPC .................................................. 293/132, 133
See application file for complete search history.

(56) References Cited

U.S. PATENT DOCUMENTS

| 3,814,470 A | 6/1974 | Kicher et al. |
| 4,460,206 A * | 7/1984 | Peter ....................... B60R 19/26 293/120 |
| 6,814,381 B1 * | 11/2004 | Frank ....................... B60R 19/34 293/120 |
| 7,192,067 B2 * | 3/2007 | Hansen ................... B60R 19/34 293/132 |

(Continued)

FOREIGN PATENT DOCUMENTS

| JP | H03-103848 U | 10/1991 |
| JP | 2001-122058 A | 5/2001 |

(Continued)

OTHER PUBLICATIONS

Japanese Office Action dated Aug. 21, 2018 with English translation, 18 pages.

*Primary Examiner* — Jason S Daniels
(74) *Attorney, Agent, or Firm* — Rankin, Hill & Clark LLP

(57) ABSTRACT

An object of the present invention is to provide a vehicle body structure which does not require a specification for attaching an elongated member to the vehicle body frame when attaching the elongated member and does not require time and effort for attaching the elongated member. The vehicle body structure includes a bumper beam, an extension member disposed between the bumper beam and a vehicle body frame and having a space therein, and an elongated member disposed in the space and absorbing an impact received from the bumper beam side. One end of the elongated member is connected to the bumper beam, and the other end thereof is connected to the extension member.

5 Claims, 3 Drawing Sheets

(56) References Cited

U.S. PATENT DOCUMENTS

| | | | |
|---|---|---|---|
| 8,496,287 B2* | 7/2013 | Matsuura | B62D 21/152 |
| | | | 293/132 |
| 8,662,566 B1 | 3/2014 | Edwards et al. | |
| 9,884,599 B2* | 2/2018 | Daido | B60R 19/34 |
| 2010/0026021 A1 | 2/2010 | Fang et al. | |
| 2012/0032459 A1 | 2/2012 | Fang et al. | |
| 2017/0151919 A1* | 6/2017 | Kashiwagi | B60R 19/34 |

FOREIGN PATENT DOCUMENTS

| | | |
|---|---|---|
| JP | 2010-505694 A | 2/2010 |
| JP | 5639293 B2 | 12/2014 |

\* cited by examiner

VEHICLE BODY STRUCTURE

CROSS REFERENCE TO RELATED APPLICATIONS

This application claims the foreign priority benefit under Title 35, United States Code, § 119(a)-(d) of Japanese Patent Application No. 2016-254795, filed on Dec. 28, 2016, the disclosure of which is herein incorporated by reference in its entirety.

TECHNICAL FIELD

The present invention relates to a vehicle body structure.

BACKGROUND ART

Patent Document 1 describes a vehicle body structure in which one ends of left and right outer elongated members 64, 66 are respectively fastened to left and right ends of a bumper beam 14 by fasteners 124, and the other ends of the outer elongated members 64, 66 are respectively fastened to left and right upper frames 22, 24 by fasteners 126 (see FIG. 2 of Patent Document 1). When an impact is applied from the bumper beam side, the outer elongated members 64, 66 buckle to absorb the impact.

CITATION LIST

Patent Literature

Patent Document 1: Japanese Patent No. 5639293

SUMMARY OF INVENTION

Technical Problem

However, in the vehicle body structure of Patent Document 1, a specification for attaching the outer elongated member to the vehicle body frame (left and right upper frames 22, 24) is required, and it takes time and effort for attachment. Therefore, an object of the present invention is to provide a vehicle body structure which does not require a specification for attaching an elongated member to the vehicle body frame when attaching the elongated member and does not require time and effort for attaching the elongated member.

Solution to Problem

An aspect of the present invention is a vehicle body structure including a bumper beam, an extension member disposed between the bumper beam and a vehicle body frame and having a space therein, and an elongated member disposed in the space and absorbing an impact received from the bumper beam side, wherein one end of the elongated member is connected to the bumper beam, and the other end thereof is connected to the extension member.

Advantageous Effects of Invention

According to the present invention, the specification for attaching the elongated member to the body frame can be made unnecessary, and time and effort for attaching the elongated member can also be made unnecessary.

DESCRIPTION OF EMBODIMENTS

Hereinafter, an embodiment of the present invention will be described with reference to the drawings.

[First Aspect of the Present Invention]

Figure 1:
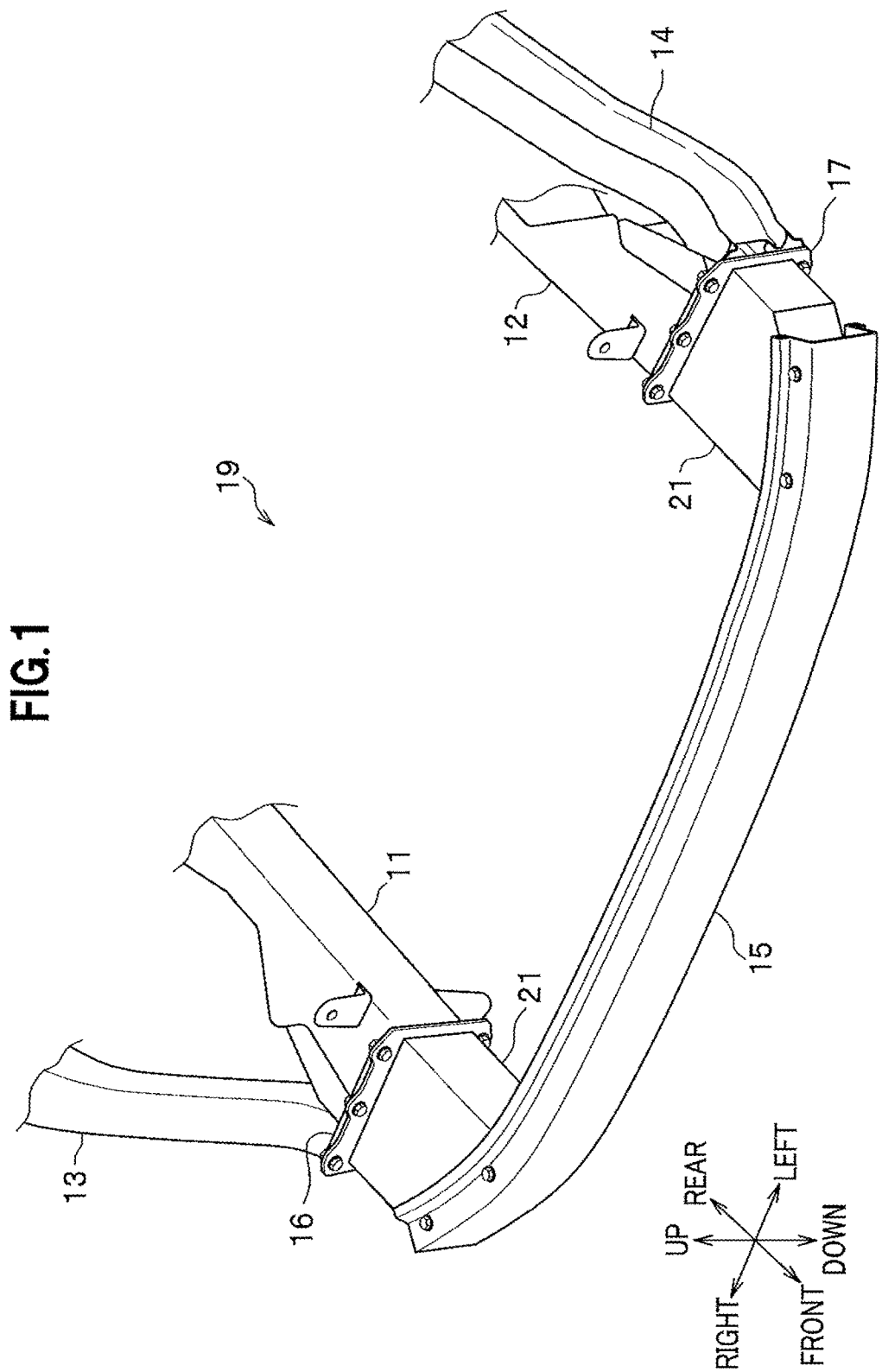
FIG. 1 is a perspective view showing a vehicle body structure of a front portion of a vehicle according to an embodiment of the present invention.

FIG. 1 is a perspective view showing a vehicle body structure of a front portion of a vehicle according to the present embodiment. Note that directions viewed from the vehicle are appropriately shown in each of FIGS. 1 to 5. The vehicle body structure includes a right front frame 11 forming a right frame of a front portion of the vehicle and a left front frame 12 forming a left frame of the front portion of the vehicle. A front end of a right upper frame 13 forming a frame on an upper right side of the vehicle is joined to a front end of the right front frame 11. A front end of a left upper frame 14 forming a frame on an upper left side of the vehicle is joined to a front end of the left front frame 12.

A bumper beam 15 is attached to a front portion of a vehicle body frame 19 having such a structure. That is, a right end of the bumper beam 15 is attached to a front end 16 of the right upper frame 13 and the right front frame 11, and a left end of the bumper beam 15 is attached to a front end 17 of the left upper frame 14 and the left front frame 12. Extension members 21 are respectively disposed between the bumper beam 15 and the front ends 16, 17 of the vehicle body frame 19 on both the right end side and the left end side of the bumper beam 15.

Figure 2:
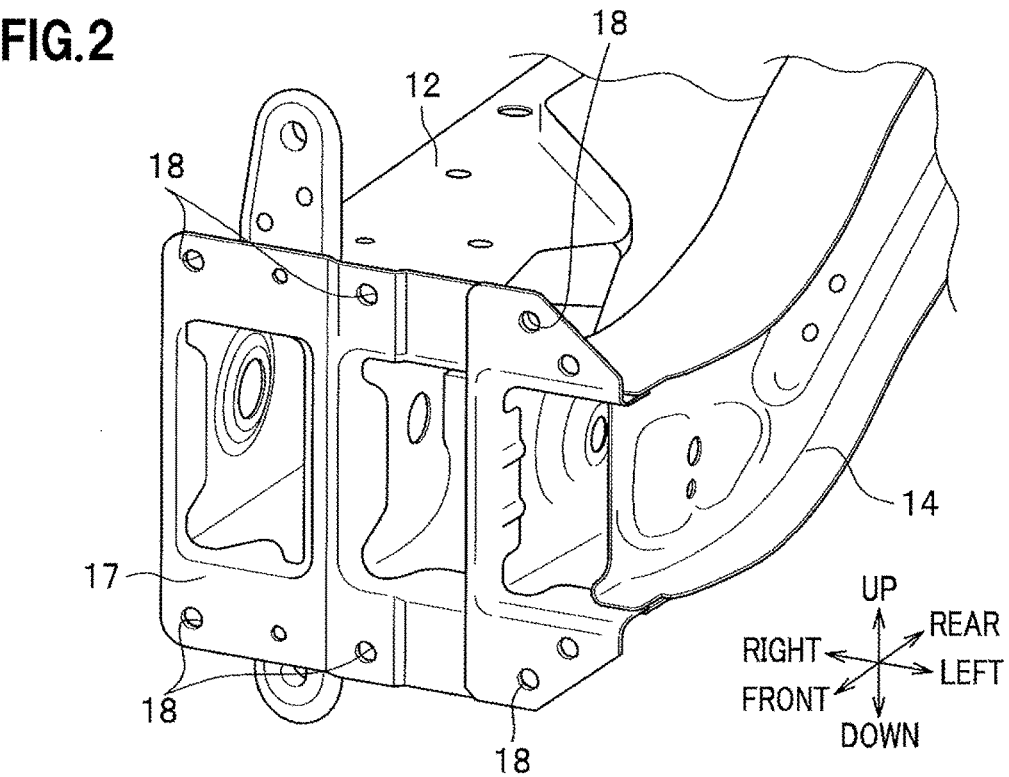
FIG. 2 is a perspective view of a front end of a vehicle body frame in the vehicle body structure according to the embodiment of the present invention.

FIG. 2 is a perspective view of the front end 17 of the vehicle body frame. The left front frame 12 is hollow and the left upper frame 14 also has a hollow structure. A plurality of bolt holes 18 are formed at upper and lower portions of the front end 17. A structure of the front end 16 of the vehicle body frame is also the same.

Figure 3:
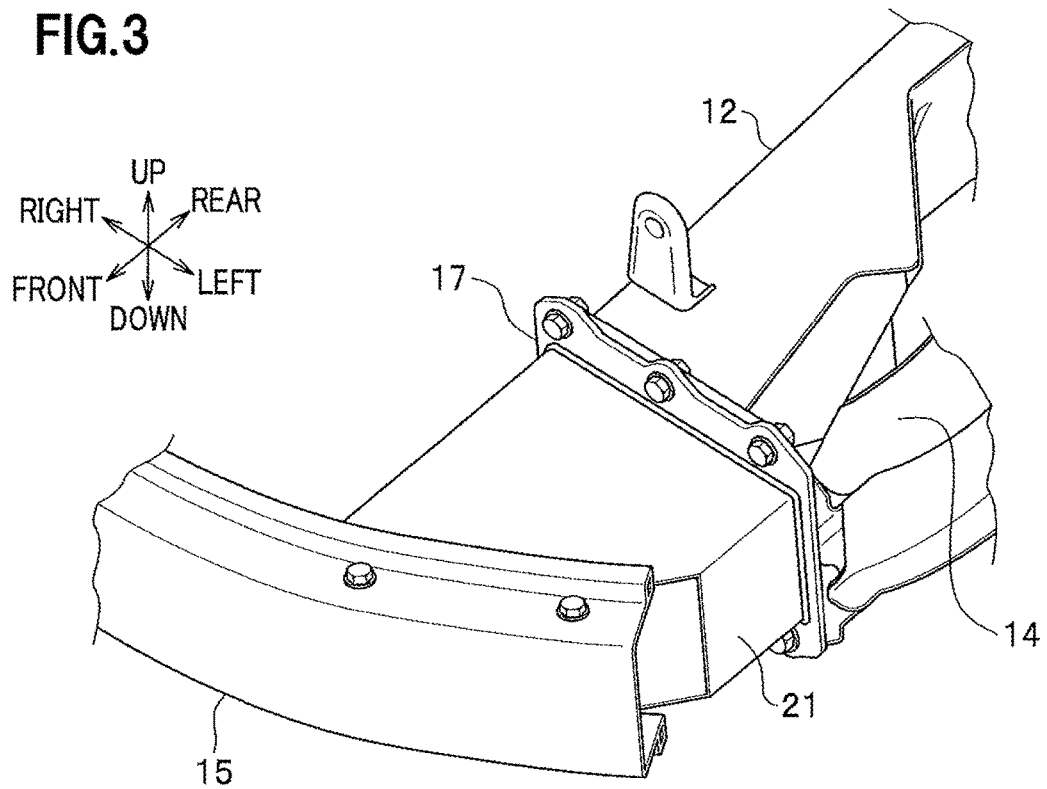
FIG. 3 is a perspective view showing a state in which a bumper beam and an extension member are attached to the front end of the vehicle body frame in the vehicle body structure according to the embodiment of the present invention.

FIG. 3 is a perspective view showing a state in which the bumper beam 15 and the extension member (crash box) 21 are attached to the front end 17 of the vehicle body frame. The extension member 21 is bolted to the front end 17 of the vehicle body frame, and the bumper beam 15 is attached to a front portion of the extension member 21 (details will be described below). A structure on the front end 16 side of the vehicle body frame is also the same.

Figure 4:
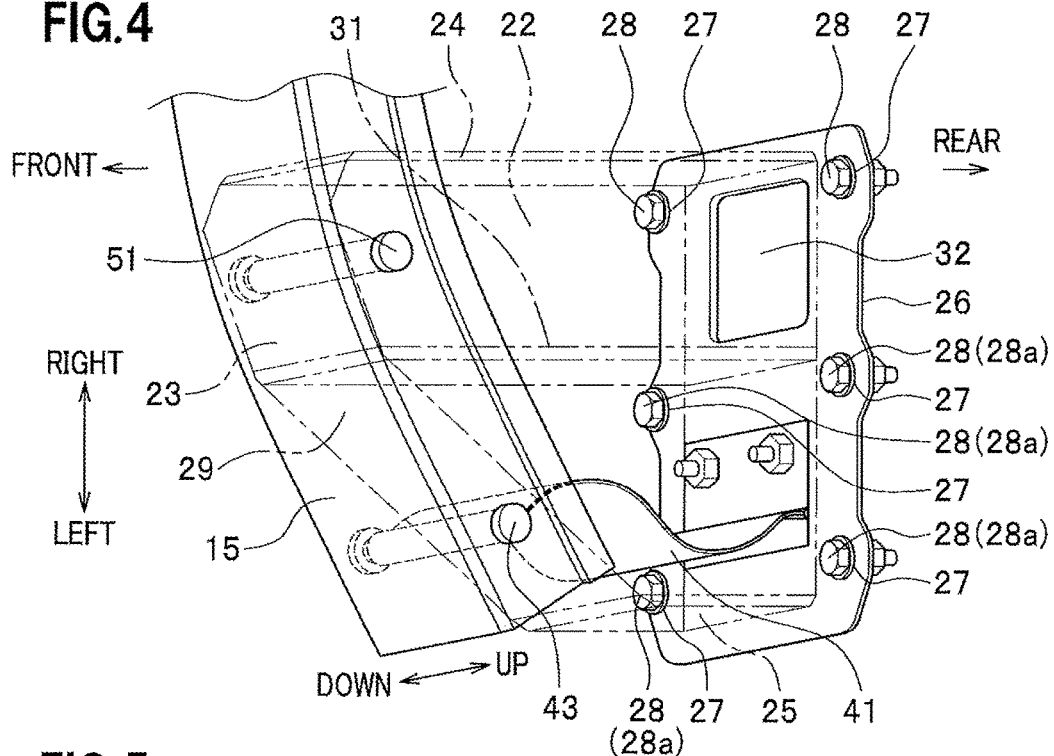
FIG. 4 is a perspective view showing a state in which the bumper beam and the extension member are attached on a left side of the vehicle in the vehicle body structure according to the embodiment of the present invention, and is drawn through a housing.

FIG. 4 is a perspective view showing a state in which the bumper beam 15 and the extension member 21 are attached on the left side of the vehicle body, and is drawn through the housing. A state in which the bumper beam 15 and the extension member 21 are attached on the right side of the vehicle body is also the same as FIG. 4 except that it is symmetrical with the left side of the vehicle body.

The extension member 21 has a housing 23 whose interior is a space 22. In the housing 23, a wall 25 on a vehicle exterior side is shorter than a wall 24 on a vehicle interior side in a front-rear direction of the vehicle body according to the fact that left and right end sides of the bumper beam 15 are curved rearwardly of the vehicle body. Further, a front portion with reference numeral 29 of the housing 23 is open. A wall on a vehicle body rear side of the extension member 21 forms a back plate 26. An outer peripheral edge of the back plate 26 extends outwardly of the housing 23. A plurality of bolt holes 27 are formed in the back plate 26 at portions extending upwardly and downwardly of the housing 23, and bolts 28 are inserted into the bolt holes 27 and bolted to the bolt holes 18 shown in FIG. 2, so that the extension member 21 can be fixed to the front end 17 of the vehicle body frame 19. An interior of the extension member 21 is partitioned in a left-right direction of the vehicle body by a partition plate 31. A rectangular opening 32 is provided on the vehicle interior side of the partition plate 31 in the back plate 26.

An elongated member 41 for absorbing an impact received from the bumper beam 15 side is provided on the vehicle exterior side of the partition plate 31 in the space 22. One end of the elongated member 41 is connected to the bumper beam 15, and the other end thereof is connected to the back plate 26 of the extension member 21.

[Fifth and Sixth Aspects of the Present Invention]

The back plate 26 forming the wall on the vehicle body rear side of the extension member 21 is fastened to the vehicle body frame 19 by the bolts 28 at three or more fastening points, or at six fastening points in the present embodiment. A connection position of the elongated member 41 and the extension member 21 is in a polygonal (rectangular in the present embodiment) region connecting three or more fastening points (bolts 28*a*), or four fastening points in the present embodiment, of the back plate 26.

Figure 5:
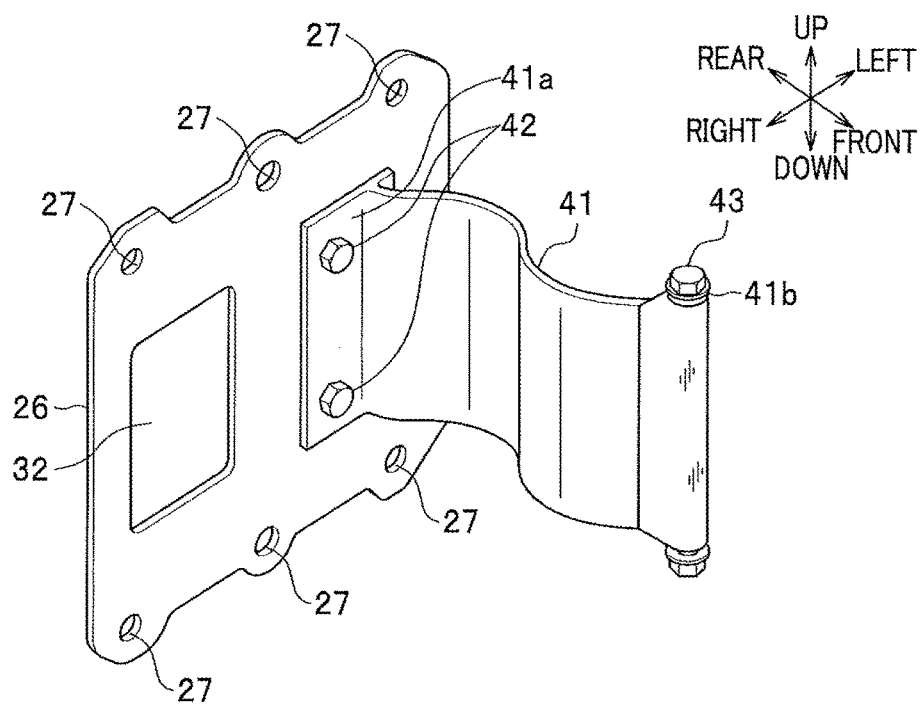
FIG. 5 is a perspective view showing a fastening structure between a back plate and an elongated member in the vehicle body structure according to the embodiment of the present invention.

More specifically, as shown in FIG. 5, an end of the elongated member 41 on the extension member 21 side is T-shaped, and a T-shaped projection 41*a* at the end of the elongated member 41 is fastened to the back plate 26 by bolts 42. The T-shaped projection 41*a* is in a polygonal region connecting the four fastening points of the bolts 28*a*, and is positioned on the vehicle exterior side of the partition plate 31 (FIG. 4).

[Fourth Aspect of the Present Invention]

As shown in FIG. 4, as a result of such fastening between the elongated member 41 and the back plate 26, a connection between the elongated member 41 and the extension member 21 is in the front-rear direction of the vehicle.

[Third Aspect of the Present Invention]

In the elongated member 41, a bumper beam 15 side portion thereof is curved convexly inwardly of the vehicle, and the extension member 21 side portion thereof is curved convexly outwardly of the vehicle. Direction of this curvature may be reversed. That is, the curved shape of the elongated member 41 is S-shaped in a plan view.

[Second Aspect of the Present Invention]

Next, a connection between the bumper beam 15 and the extension member 21 will be described. As shown in FIG. 4, the bumper beam 15 and the elongated member 41 are connected by fastening the bumper beam 15 and the elongated member 41 with a single bolt 43 whose longitudinal direction is a vertical direction, the bolt 43 being inserted into a bolt hole 41*b* (FIG. 5) formed at an end on the bumper beam 15 side of the elongated member 41. Thus, the bumper beam 15 has rotational freedom around a rotation axis in the vertical direction. A front end of the elongated member 41 protrudes from an opening 29 and is inserted into the bumper beam 15, to be connected to the bumper beam 15 by the single bolt 43 in the bumper beam 15.

Next, operational effects of the above-described vehicle body structure will be described.

[First Aspect of the Present Invention]

In the present embodiment, one end of the elongated member 41 is connected to the extension member 21. The one end of the elongated member 41 is not fastened to the vehicle body frame as is different from the above-described Patent Document 1. Therefore, a specification for attaching the elongated member to the vehicle body frame (the upper frames 13, 14 and the like) can be made unnecessary, and time and effort for the attachment can also be made unnecessary. In this way, since the elongated member 41 and the extension member 21 form an integral part and the elongated member 41 is assembled to the extension member 21, the attachment of the member 41 toward the vehicle body frame is completed by attaching the extension member 21 to the front end 17 (FIG. 2). When an offset collision occurs in the vehicle body of the present embodiment, the elongated member 41 on a collision side out of the left and right sides of the vehicle body receives a load from the bumper beam 15 and buckles to absorb the impact of the collision. At this time, the elongated member 41 on a side which does not collide plays a role of preventing the bumper beam 15 from moving forward of the vehicle due to the impact of the collision.

[Second Aspect of the Present Invention]

Further, in the present embodiment, since the bumper beam 15 has rotational freedom around each of right and left bolts 51, the bumper beam 15 can easily rotate when a full-wrap collision occurs. Therefore, it is possible to reduce a moment applied to the vehicle body frame 19, thereby easily and efficiently crushing the extension member 21. This is suitable for a compact vehicle in which the load to the body frame 19 is relatively light.

Further, in the above-described Patent Document 1, the bumper beam is fixed to the vehicle body at two points (bolts 102) on each of left and right sides. In contrast, in the present embodiment, since the bumper beam is fixed to the vehicle body at one point (bolt 51) on each of the left and right sides, the elongated member 41 receives the load from the bumper beam 15 and easily buckles when the full-wrap collision occurs in the vehicle body.

[Third Aspect of the Present Invention]

In the elongated member 41, the bumper beam 15 side portion thereof is curved convexly inwardly of the vehicle, and the extension member 21 side portion thereof is curved convexly outwardly of the vehicle. The direction of this curvature may be reversed. By adopting such a curved shape, it is possible not to affect crushing of the extension member 21. That is, because the elongated member 41 can easily buckle due to the curved shape upon the full-wrap collision.

[Fourth Aspect of the Present Invention]

In Patent Document 1, fastening of the elongated member to an upper frame is in the left-right direction of the vehicle body (collar 128, fastener 126 are used).

In contrast, in the present embodiment, the elongated member 41 and the extension member 21 are connected to each other in the front-rear direction of the vehicle. Since the extension member 21 is disposed between the bumper beam 15 and the vehicle body frame 19, a connecting direction of the elongated member 41 and the extension member 21 can be substantially parallel to a line connecting both ends of the elongated member 41. Therefore, it is possible to efficiently absorb a tensile force in the front-rear direction and in a vehicle width direction of the bumper beam 15, which is received when an offset collision occurs on one side of the vehicle body, by the elongated member 41.

[Fifth and Sixth Aspects of the Present Invention]

The connection position of the elongated member 41 and the extension member 21 is in the polygonal region connecting the three or more fastening points (bolts 28a), or the four fastening points in the present embodiment, of the back plate 26. Further, the elongated member 41 is fastened to the back plate 26 in a T-plane by using the T-shaped projection 41a. Therefore, it is possible to increase bearing strength of the back plate 26 against the impact from the elongated member 41.

REFERENCE SIGNS LIST

15: bumper beam
19: vehicle body frame
21: extension member
22: space
26: back plate
41: elongated member
41a: projection
51: bolt

The invention claimed is:

1. A vehicle body structure comprising:
    a bumper beam;
    an extension member disposed between the bumper beam and a vehicle body frame and having a space therein, and
    an elongated member disposed in the space and absorbing an impact received from the bumper beam side,
    wherein
    one end of the elongated member is connected to the bumper beam, and another end of the elongated member is provided with a T-shaped projection and is connected to the extension member by fastening the T-shaped projection to the extension member.

2. The vehicle body structure according to claim 1, wherein the bumper beam has a rotational degree of freedom with a vertical direction as a rotation axis with respect to the extension member.

3. The vehicle body structure according to claim 1, wherein
    in the elongated member, one of a bumper beam side portion of the elongated member and an extension member side portion of the elongated member is curved convexly inwardly of a vehicle and the other of them is curved convexly outwardly of the vehicle in a top view.

4. The vehicle body structure according to claim 1, wherein
    a connection between the elongated member and the extension member is in a front-rear direction of the vehicle.

5. The vehicle body structure according to claim 1, wherein
    a backplate forming a wall on a vehicle body rear side of the extension member is fastened to the vehicle body frame at three or more fastening points, and
    a connection position of the elongated member with the extension member is in a polygonal region connecting three or more fastening points of the back plate.

* * * * *